United States Patent
Ondrasik

(10) Patent No.: US 9,346,477 B1
(45) Date of Patent: May 24, 2016

(54) STACKABLE CART

(71) Applicant: V. John Ondrasik, Commerce, CA (US)

(72) Inventor: V. John Ondrasik, Commerce, CA (US)

( * ) Notice: Subject to any disclaimer, the term of this patent is extended or adjusted under 35 U.S.C. 154(b) by 0 days.

(21) Appl. No.: 14/542,258

(22) Filed: Nov. 14, 2014

(51) Int. Cl.
| | |
|---|---|
| *A47F 5/01* | (2006.01) |
| *B62B 3/16* | (2006.01) |
| *B62B 3/14* | (2006.01) |
| *B62B 3/00* | (2006.01) |
| *B62B 5/00* | (2006.01) |

(52) U.S. Cl.
CPC . *B62B 3/16* (2013.01); *B62B 3/001* (2013.01); *B62B 3/1476* (2013.01); *B62B 3/1492* (2013.01); *B62B 5/0006* (2013.01); *B62B 2301/08* (2013.01)

(58) Field of Classification Search
None
See application file for complete search history.

(56) References Cited

U.S. PATENT DOCUMENTS

| | | | | |
|---|---|---|---|---|
| 3,705,654 | A * | 12/1972 | Barrineau, III | A47F 5/13 108/110 |
| 5,040,265 | A * | 8/1991 | France | B60B 33/028 16/35 R |
| 5,645,290 | A * | 7/1997 | Gaffney | B62B 7/04 280/33.998 |
| 5,785,328 | A * | 7/1998 | Eckloff | B62B 3/16 206/821 |
| 6,203,029 | B1 * | 3/2001 | Ondrasik | B60B 33/0039 280/33.991 |
| 6,685,200 | B1 * | 2/2004 | Giannoni | B62B 3/02 108/57.16 |
| 6,979,005 | B1 * | 12/2005 | McLerran | B62B 3/00 108/53.1 |
| 2003/0205876 | A1 * | 11/2003 | Orozco | A47F 5/137 280/79.3 |
| 2003/0234517 | A1 * | 12/2003 | Sagol | B62B 5/06 280/655.1 |
| 2006/0103094 | A1 * | 5/2006 | Wiff | B60D 1/00 280/79.11 |
| 2006/0261564 | A1 * | 11/2006 | Chuang | B62B 1/125 280/47.27 |
| 2009/0020449 | A1 * | 1/2009 | Artinger | B62B 3/002 206/518 |
| 2011/0089652 | A1 * | 4/2011 | Unnerstall, Jr. | B62B 3/04 280/33.996 |

FOREIGN PATENT DOCUMENTS

DE    EP 2014535 A2 *  1/2009  ............. B62B 3/002

* cited by examiner

*Primary Examiner* — Joseph Rocca
*Assistant Examiner* — Hilary L Johns
(74) *Attorney, Agent, or Firm* — Gordon Rees Scully Mansukhani LLP

(57) ABSTRACT

A stackable cart comprises a base comprising perimetral edges, front, middle, and rear portions, and an internal wired base support structure with a network of support wires. A plurality of front wheels is provided to support the front portion, wherein a chord of the front wheel corresponds to a stacking space defined between a plurality of front transverse wires of the network support wires. A plurality of rear wheels is provided to support the rear portion, wherein a chord of the rear wheel corresponds to a stacking space defined between a plurality of rear transverse wires of the network support wires. The cart is removably coupled to another equivalent cart by positioning the rear wheels of the cart adjacent to the stacking space of the rear transverse wires of the equivalent cart and positioning the front wheels of the cart adjacent to the stacking space of the front transverse wires of the equivalent cart.

10 Claims, 9 Drawing Sheets

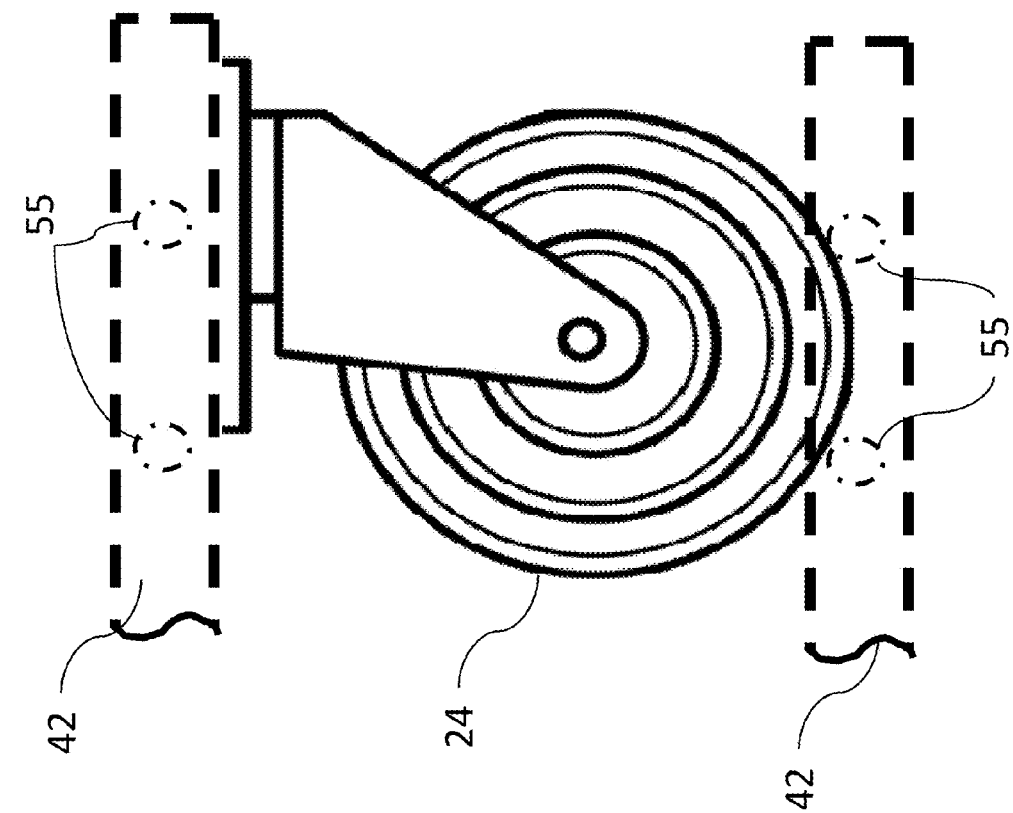
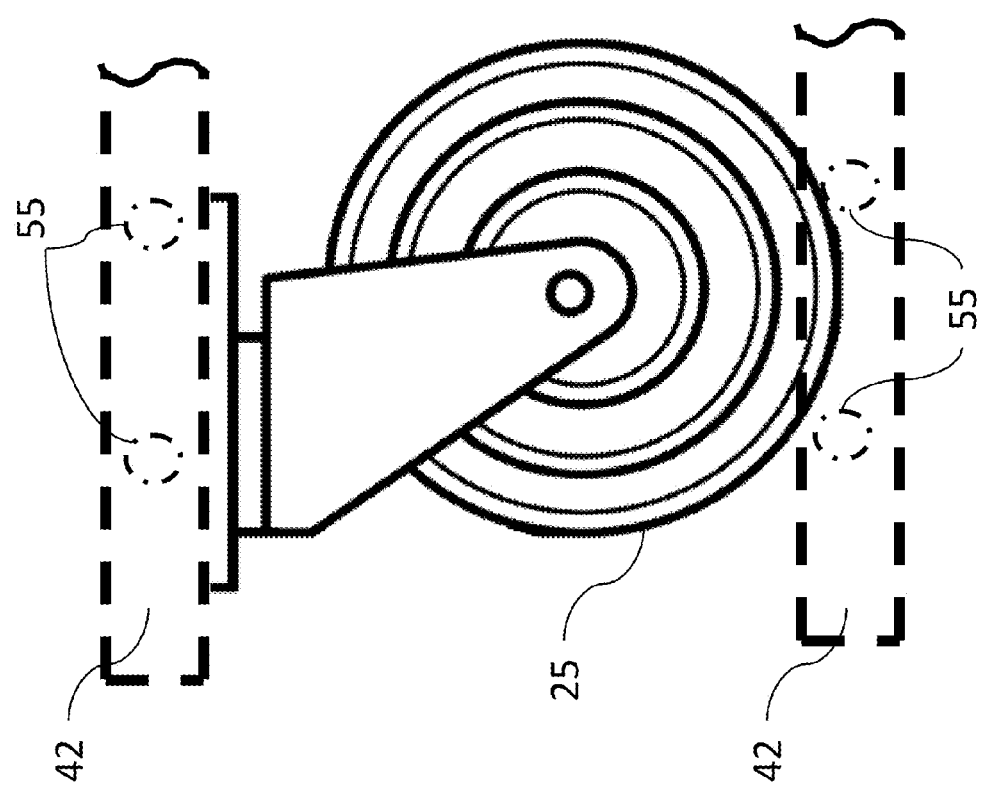

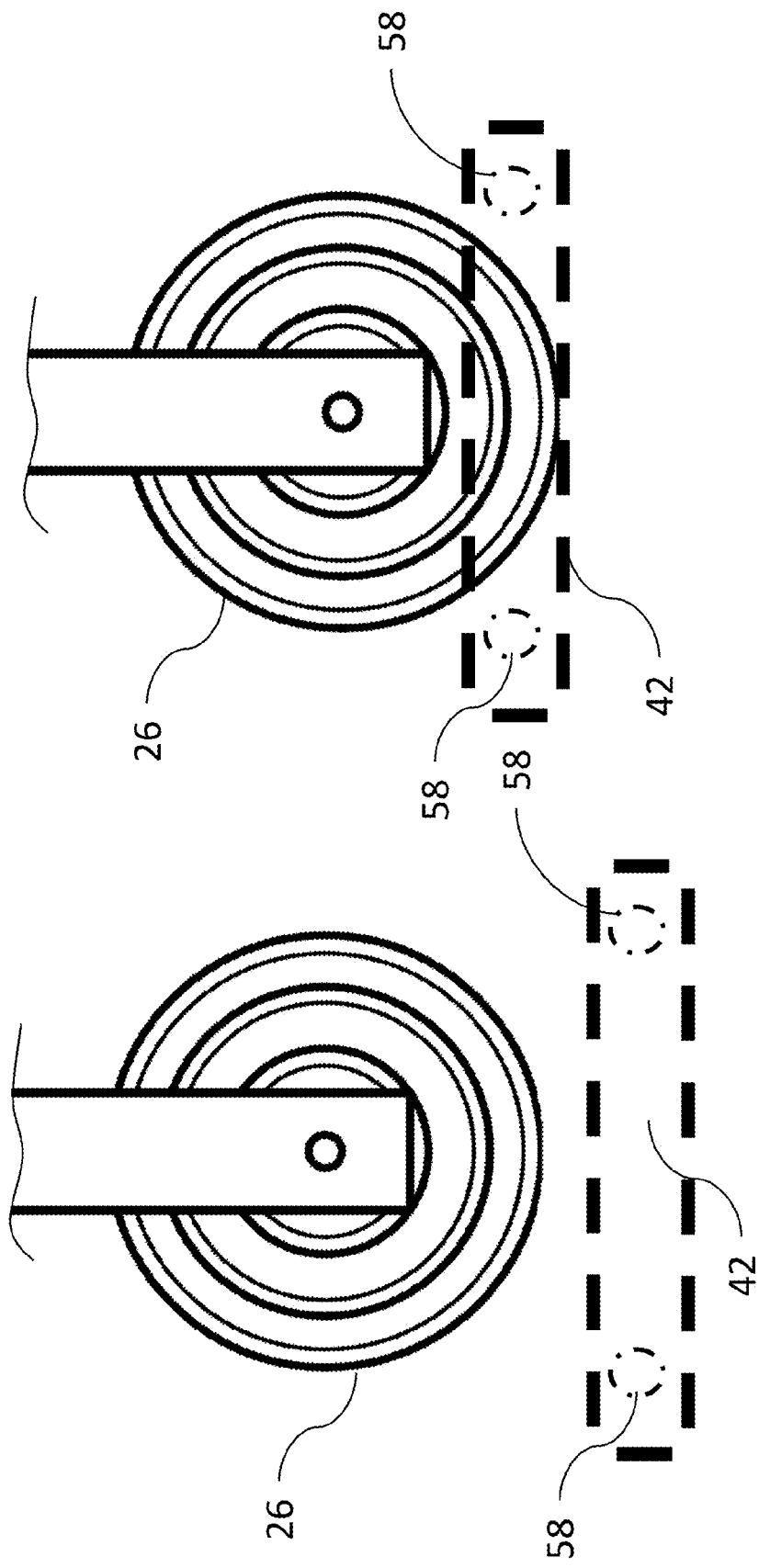

STACKABLE CART

FIELD

The present disclosure relates generally to stackable carts and dollies and is particularly concerned with lightweight, vertically stackable wire and tube carts and dollies.

BACKGROUND

Many carts and dollies exist to carry objects between locations. These may include shopping carts seen in stores or dollies designed to move heavier objects or materials. These carts typically utilize a set of wheels, support structure to receive the objects, and associated handles through which a user can drive the loaded cart or dolly between locations.

These carts and dollies typically are designed to be stacked in horizontal lines for purposes of storage and ease of transporting multiple carts at the same time. Some carts such as dollies, however, are typically not horizontally stackable and therefore consume relatively large amounts of otherwise useful space when stored. Previous approaches have considered relatively complex solutions to stack carts such as hinged rear walls or bases that have to pivot upwardly or inwardly so as to allow carts to stack. This consumes more material, is more difficult to manufacture, and damage to hinges or pivots can cause stacked carts to easily jam together. Moreover, specific to dollies, previous approaches required moving parts and did not allow the forward end of one dolly to be fully stacked to the forward end of a second dolly.

Accordingly, there exists a need to provide a cart that is vertically stackable so that when stacked, storage space is conserved to the extent possible. There also exists a need to provide vertical stacking to carts without incorporation of complex systems or moving parts. Having fewer moving parts is particularly advantageous since it reduces undesirable noise during use, reduces overall weight of the cart, and decreases likelihood of failure when two or more carts are stacked. Fewer moving parts also reduces overall required maintenance.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In some embodiments, a vertically stackable cart comprises a base. The base comprises front, middle, and rear portions, wherein the front and rear portions may be interchangeable. A plurality of front wheels supports the front portion of the base above a lower surface. A plurality of rear wheels support the rear portion of the base above the lower surface. A frame comprises perimetral edges defined by the front, middle, and rear portions of the base, wherein the frame further comprises internal support structure to distribute structural loads subjected to the cart. The internal support structure comprises a plurality of front and rear transverse support members. The front transverse support members are adjacent to the front portion extending between lateral edges of the perimetral edges, wherein two adjacent transverse support members provide a space corresponding to a chord of the front wheel. The rear transverse support members are adjacent to the rear portion extending between lateral edges of the perimetral edges, wherein two adjacent rear transverse support members provide a space corresponding to a chord of the rear wheel.

The base of the cart may be substantially planar. The front and/or rear transverse support members may comprise one or more sets of double cross wires. The wheels may be removably attachable to the base. The space of the front and/or rear transverse support members may be adjustable.

In some embodiments, the cart is stacked on top of an equivalent cart by positioning the plurality of front and rear wheels in the corresponding spaces of the plurality of front and rear transverse support members of the equivalent cart. Inwardly rotating the front and rear wheels may cause the cart to be secured in place when the cart is received by corresponding front and rear transverse support members of the equivalent cart.

The cart may further comprise a plurality of middle wheels to support the middle portion of the base, wherein the middle wheel rests lower than the front and/or rear wheels. This is achieved by the middle wheel having a chord greater than the chords of the front and/or rear wheels. The internal support structure may comprise middle transverse support members that extend between the lateral edges of the frame along the middle portion of the base, and wherein the middle transverse support members of a lower cart comprise a space greater or deeper than the corresponding portion of the middle wheel of the upper cart so that the middle wheel is suspended when stacked.

The cart may further comprise a first and second handle. The first handle may be removably attached to a first plurality of sleeves coupled to the front portion of the base, wherein elongate supports of the first handle upwardly extend from the first plurality of sleeves when attached thereto. The second handle may be removably attached to a second plurality of sleeves coupled to the rear portion of the base, wherein elongate supports of the second handle upwardly extend from the second plurality of sleeves when attached thereto. In this embodiment, the cart may further comprise a front and a rear bumper. The front bumper may be operatively connected to the front transverse support members for forward protection of the front and the first plurality of sleeves. The rear bumper may be operatively connected to the rear transverse support members for forward protection of the rear and the second plurality of sleeves. The first and second handles may be generally U-shaped.

The elongate supports of the first and second handles may be positionable along and underneath the base in a stacked state, wherein the internal support structure may comprise a plurality of handle guides that slidably guide an associated elongate supports of an associated handle when the associated handle is in the stacked state. The shape of the cross-section of the handle guide may be defined by the associated elongate support of the associated handle. The cross-section may be generally rectangular, circular, u-shaped, elliptical, square, or polygonal. The sleeves of the cart may be removably attachable to the base. Each cart may further comprise two or more pockets in positions along the lateral edges of the frame, wherein one or more additional handles with elongate supports may be removably attached to the two or more pockets so that elongate supports vertically extend through the two or more pockets.

The internal support structure of the cart may comprise a plurality of longitudinal support members extending between the front and rear portions of the base and a plurality of transverse support members including the front and rear transverse support members. The transverse support members may substantially encircle edges of the longitudinal support members along the lateral edges of the frame.

In another embodiment, a vertically stackable cart may comprise a base with perimetral edges and front, middle and rear portions. The base may further comprise an internal wired base support structure comprising a network of support wires. A plurality of front wheels supports the front portion, wherein a chord of the front wheel corresponds to a stacking space defined between a plurality of front transverse wires of the network of support wires. A plurality of rear wheels supports the rear portion, wherein a chord of the rear wheel corresponds to a stacking space defined between a plurality of rear transverse wires of the network support wires. Accordingly, the cart is removably stackable and therefore vertically stackable to an equivalent cart by positioning the rear wheels of the cart adjacent to the rear transverse wires of the equivalent cart and positioning the front wheels of the cart adjacent to the front transverse wires of the equivalent cart.

In other embodiments, a cart may comprise a base with a front portion, a middle portion, and a rear portion. The may comprise an upper and a lower frame, each frame comprising perimetral edges defined by the front, middle, and rear portions of the base, wherein a space is positioned between each frame. In this respect the upper and lower frames may be substantially parallel with each other. An internal support structure may be positioned in the upper frame, the internal support structure comprising a plurality of support members adjacent to the front portion and the rear portion extending between the perimetral edges. A plurality of front wheels may be mounted to the lower frame supporting the front portion of the base and a plurality of rear wheels may be mounted to the lower frame supporting the rear portion of the base.

In this respect, the described cart may comprise one or more generally vertical edge bumpers that are mechanically attached to the lower frame. Each edge bumper may be positioned between the front wheels or the rear wheels and may extending away from the lower frame either downwards or downwards and passed the corresponding wheel in order to protect the cart from corresponding objects such as opposing carts, curbs, or the like. The one or more edge bumpers may extend downwards from one location or multiple locations on the lower frame in a C-shaped or U-shaped member.

The cart may likewise comprise one or more frame support bridges between the upper and lower frame in order to both support each frame and provide adequate spacing between the two.

The cart may further comprise one or more horizontal edge bumpers positioned on an edge of the upper or lower frame and preferably adjacent to or nearby a corner. Each horizontal edge bumper may comprise a wheel rotatably connected to a rotatable member mounted to the upper and/or lower frame. In this respect, each wheel of an associated horizontal edge bumper may extend partially away from the upper or lower frame.

A method of vertically stacking carts is also provided comprising the following steps: having a plurality of any of the above described vertically stackable carts. A first cart is then positioned on top of the base of a second of the plurality of carts so that the rear wheels of the first cart are received by the space of the rear transverse wires of the second cart and the front wheels of the first cart are received by the front transverse wires of the second cart causing the first cart to removably stack to the second cart.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 6A depicts an enlarged view of FIG. 2 showing various wheels when the carts are in a stacked state, wherein a wheel of is depicted positioned between certain features of the cart. FIG. 6B depicts a similar enlarged view of FIG. 2 with another wheel being depicted positioned between certain features of the cart.

FIG. 7A depicts an enlarged view of FIG. 2 depicting a wheel of one cart being situated slightly above a corresponding cart below. FIG. 7B depicts the wheel of FIG. 7A now having been lowered and/or situated below certain features.

DETAILED DESCRIPTION

The features of the present disclosure may be economically molded by using one or more distinct parts and associated components which, when assembled together may form the disclosed stackable cart regardless of the particular form. Unless defined otherwise, all terms of art, notations and other scientific terms or terminology used herein have the same meaning as is commonly understood by one of ordinary skill in the art to which this disclosure belongs.

In some cases, terms with commonly understood meanings are defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more." As used herein, the term "user", "subject", "end-user" or the like is not limited to a specific entity or person. For example, the term "user" may refer to a person who uses the systems and methods described herein, and frequently may be a field technician. However, this term is not limited to end users or technicians and thus encompasses a variety of persons who can use the disclosed systems and methods.

The stackable cart described herein is configured to vertically stack two or more carts or dollies using relatively lightweight carts, wherein front and/or rear wheels of a first cart removably seat the first cart to an upper surface of a wheeled based of a second cart without the need for any complex, moving parts.

Figure 1:
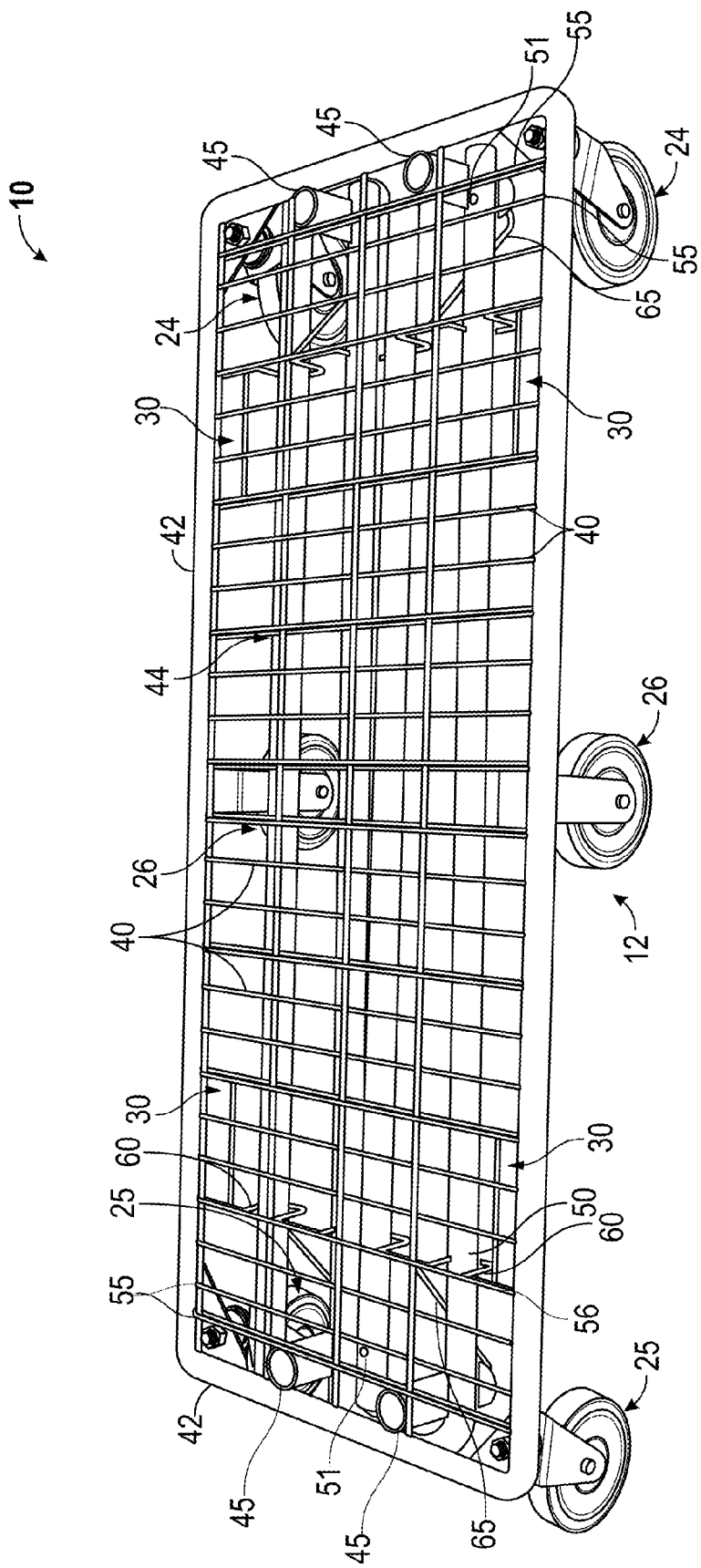
FIG. 1 is perspective view of the cart according to a preferred embodiment.

FIG. 1 depicts a perspective view of the cart 10 according to an exemplary embodiment. It can be seen that cart 10 comprises base 12. Base 12 comprises a generally rectangular frame 42 that is substantially planar with front, rear, and middle portions. It is understood that the front and rear portions may be interchangeable. In some embodiments, base 12 may be in an alternative shape and may not be substantially planar. Further, base 12 may be open or closed at or along any of the perimetral edges of frame 42 (there are four edges in the FIG. 1). Further, frame 42 may be formed from tubular wire members. Internal support structure 40 is disposed in the same plane and arranged with perimetral edges of frame 42. In some embodiments, structure 40 may be comprised of an interconnected grid of wire which can be solid, tubular, or the like of relatively smaller diameter or thickness than the diameter or thickness of perimetral edges of frame 42.

Structure 40 may comprise a plurality of longitudinal wires positioned between front and rear portions of base 12 and a plurality of transverse wires positioned between lateral edges of frame 42 of base 12. Structure 40 may be welded to edges of frame 42 or integrally formed therewith. Structure 40 may optionally comprise double cross wires 44 to provide structure 40 with increased strength such as greater bending stiffness and improved load capacity. Double cross wires 44 may be positioned along one or more directions such as oriented along transverse wires, longitudinal wires, or the like. Wires 44 may be adjacent to or in communication with any of the internal support wires of structure 40. Structure 40 and all components or features comprised therein may be multiple layered or of wire grill constructions and may be constructed from metal, plastic, or the like.

Bored out sleeve receivers 45 may be positioned adjacent to perimetral edges of frame 42 which in some embodiments is along front and/or rear portions of base 12. Receivers 45 may protrude vertically from the top section of base 12 towards the ground or plane on which cart 10 is seated. Receiver 45 mechanically attach to frame 42 or may be supported by receiver support wires 65. Receiver support wires 65 provide operative communication between receiver 45 and structure 40 of base 12 as described more particularly below. Receivers 45 may be mechanically attached, snapped onto, bolted, mounted, welded, fastened, removable attached, integrally formed with base 12 and associated frame 42 and structure 40. Receivers 45 are configured to receive handles 50 as described more particularly below. Cart 10 may further comprise any number of receivers 45 associated with any number of locations on cart 10 in accordance with design needs or preference.

Base 12 may optionally comprise one or more wire pockets 30. Pockets 30 in this embodiment may be disposed adjacent to or along lateral edges of frame 42 such that pockets 30 may be oriented perpendicular to front and rear portions of base 12. Pockets 30 may be comprised of wired structure or otherwise be bored out sleeves or receivers arranged to receive additional handles 50 and associated elongate support members. In the case of either pockets 30 or receivers 45, elongate support members of handle 50 may slidably attach into pockets 30 or receiver 45 (or otherwise removably attach to base 12) so as to secure handles 50 to cart 10. Handles 50 may removably attach to pockets 30 or receivers 45 by secure, removable fasteners such as a pin 78, hole 51, lock, hook, screw, coupling, be snapped on or the like.

Figure 3:
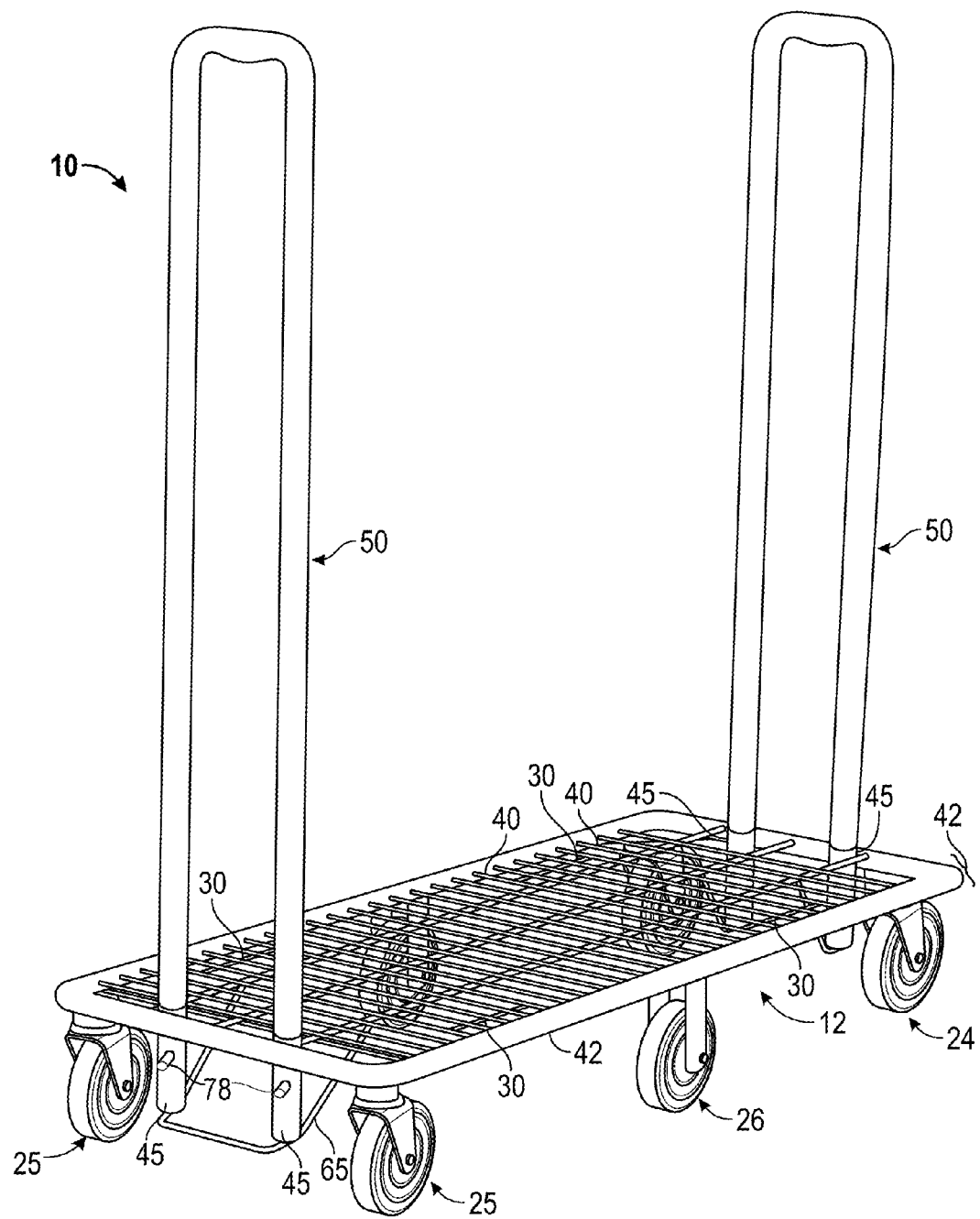
FIG. 3 is a perspective view of the cart of FIG. 1, wherein the handles protruding upwardly from the base are assembled.

To that end, receiver 45 may be configured to receive elongate pin 78 and corresponding alignment hole 51 of handle 50 so that handle 50 is slidably attached to receiver 45 at one or both of handle's 50 attachment ends. As seen in FIG. 3, a user may slide the lower, attachment end of handle 50 into receiver 45. Pin 78 is then inserted into a corresponding hole 51 to secure handle 50 to receiver 45. Once handle 50 is secured to cart 10 through associated pocket 30 or receiver 45, a user may securely stack two or more carts 10 so that stacked carts 10 are both prevented from sliding or moving from a stacked state as well as capable of being stored in relatively small space and be easily moved between locations using secured handles 50 to stack carts 10.

When not arranged in pockets 30 or receivers 45, handles 50 may be stored underneath cart 10 which serves to conserve valuable storage space when carts are stacked. In some embodiments, handles 50 may be stored using storage wires 56 and holding wires 60. Storage wire 56 may be two or more wires oriented parallel with equal or varying cross-sectional thickness that form part of structure 40 and therefore provide the added benefit of increasing overall strength of cart 10. Preferably, wires 56 extend between the longer, lateral edges of frame 42 and are configured to directly receive holding wires 60.

Holding wires 60 may be rectangular, square, circular, or otherwise formed so that a cross-section of the elongate support members of handle 50 can be slidably inserted therethrough for easy securement and storage. It can be seen that handle 50 may be C- or U-shaped with two or more protruding elongate support members such that when stored, the receiver ends of associated members are slid through holding wires 60 until a respective handle end contacts end portion of the base 12 normal to support members of the now-stored handle 50. This can be seen more clearly in FIG. 4 where receiver end of handle 50 is depicted stored adjacent to front portion of base 12.

Figure 4:
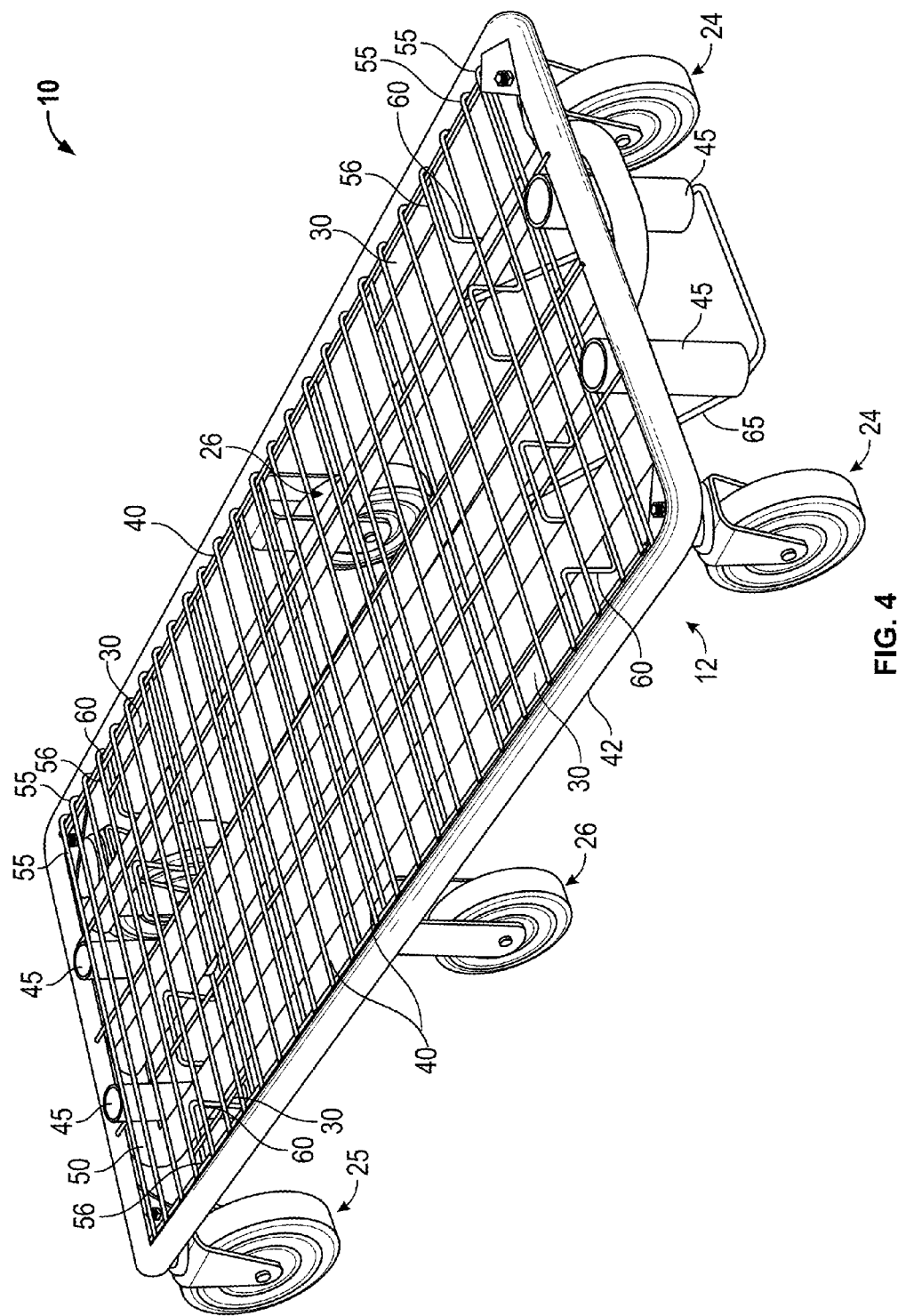
FIG. 4 is a perspective view similar to FIG. 1 depicting the cart according another embodiment.
Figure 5:
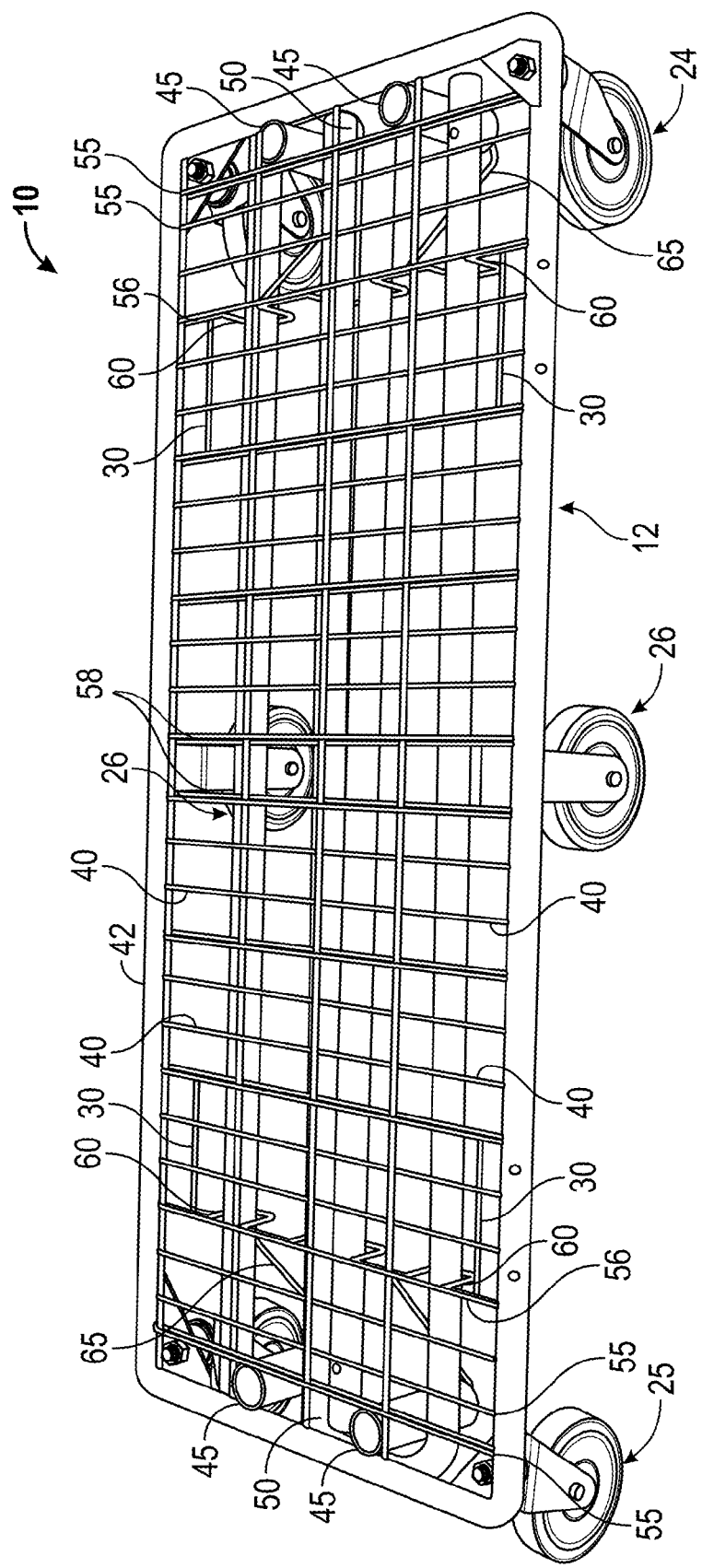
FIG. 5 is a perspective view depicting the cart according to another embodiment.

In the embodiment of FIG. 4, it can be seen that structure 40 comprises a network of transverse and longitudinal wires, wherein the transverse wires that extend between lateral perimetral edges of frame 42 are in communication with longitudinal wires of the same so that loads are distributed uniformly across structure 40. Transverse wires of FIG. 4 may encircle longitudinal wires as seen more particularly along lateral perimetral edges of frame 42, wherein the transverse wires are seen looping around corresponding longitudinal wires. Alternatively, longitudinal wires of structure 40 may be positioned between transverse wires, holding wires 60 or storage wires 56, wherein the transverse wires would not encircle the corresponding longitudinal wires and loop back from the lateral edges of the frame 42.

It can be seen that receiver support wires 65 provide support to receivers 45 by, for example, protruding downward from transverse wires and angling towards an associated front or rear portion of base 12. In some embodiments, wires 65 form a bumper configured to allow carts 10 to bump into each to protect caster wheels 24 and 25 from curbs, objects, or the like (as described more particularly below). FIGS. 3 and 4 each show wires 65 providing communication between transverse wires and the bottom of receivers 45, wherein wires 65 protrude downward from transverse wires until the bottom of receiver 45 whereby receivers 45 are secured to cart 10 and frame 42. Wires 65 may further extend horizontally passed receivers 45 as seen in FIGS. 3 and 4 so that forward protection is provided to cart 10 and associated components to prevent contact with external carts or objects.

Cart 10 may further comprise one or more front caster wheels 24 mechanically attached to the front portion of base 12. Front caster wheels 24 may be swiveled or fixed. Cart 10 may also comprise one or more rear caster wheels 25 mechanically attached to the rear portion of base 12, wherein wheels 25 may also be swiveled or fixed. Each of caster wheels 24 and 25 may be disposed adjacent to a respective corner or adjoining lateral and longitudinal edges of frame 42. Each of caster wheels 24 and 25 may alternatively be disposed anywhere along or adjacent to a respective front or rear portion of base 12.

One or more middle caster wheels 26 may be disposed between caster wheels 24 and 25. Wheel 26 may be non-swivel and generally protrude lower than wheels 24 and 25. The ratio of the chord and depth associated with wheels 24, 25, and 26 can be adjusted or changed depending on design needs or preference. Wheel 26 may attach to the underside of base 12 so that it protrudes downward from the base below a plane defined by the lowest point of wheels 24 and 25. In this embodiment, because wheel 26 is positioned by the lowest point of wheels 24 and 25, cart 10 is configured to permit rocking from end to end.

Figure 2:
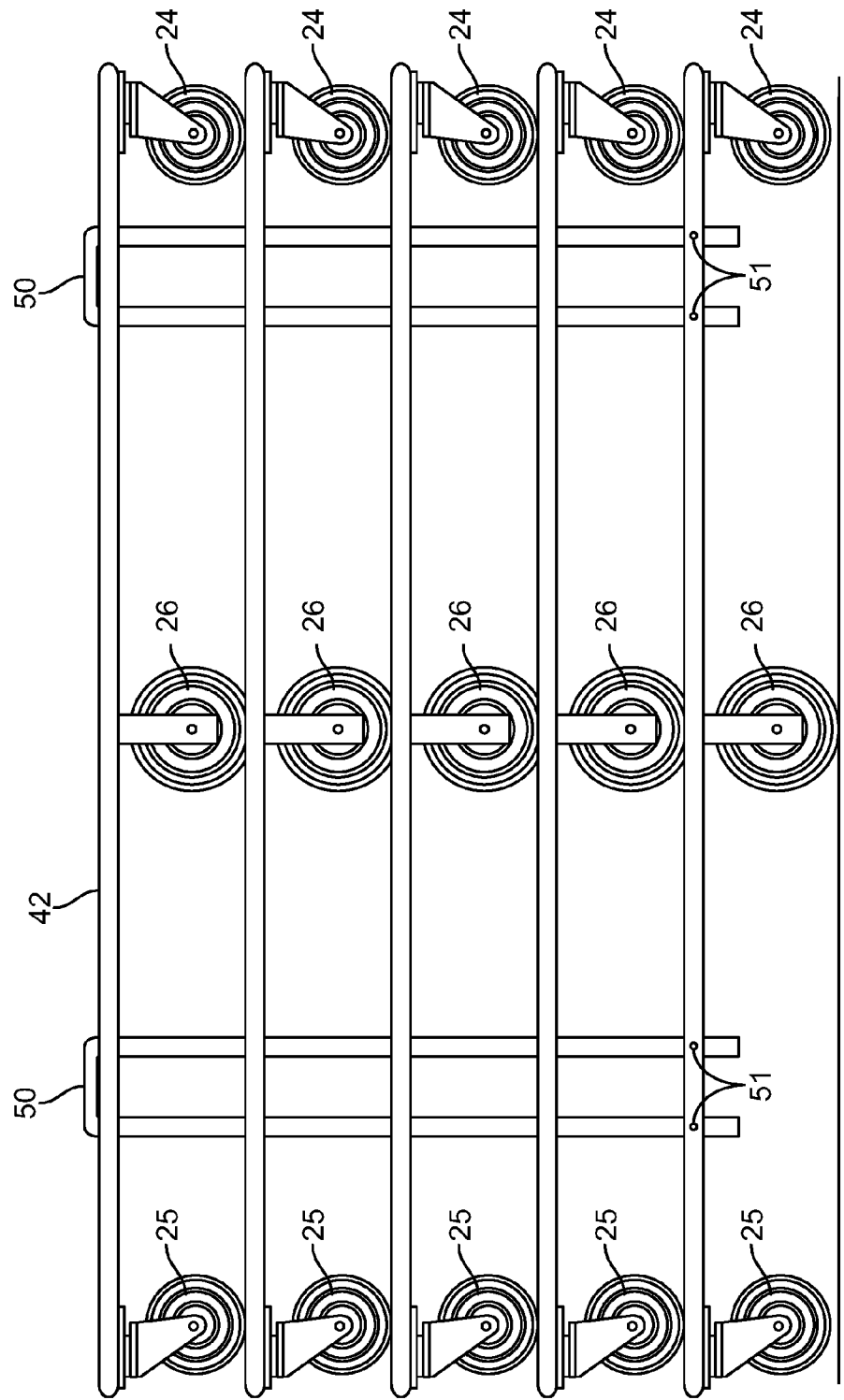
FIG. 2 is a side view showing multiple carts stacked.

In FIG. 2 specifically, the difference in relative chord size of wheels 24, 25, and 26 in a preferred embodiment is evident. Wheel 26 on the lowest cart 10 is seated directly on the ground surface. A gap may be provided between the lower surface of wheels 24 and 25 and the ground surface. Because wheels 24 and 25 are relatively smaller than wheel 26, wheels 24 and 25 may naturally rock back and forth between wheel 26 such that wheel 26 functions as a fulcrum or pivot point between wheels 24 and 25. In other words, as rear portion of base 12 of cart 10 is caused to move upward, corresponding front portion of base 12 of cart 10 is caused to move downward and vice versa in a rocking motion. This provides the advantage of being able to tilt cart 10 back slightly even when loaded with objects or additional weight so as to permit easy maneuvering.

Structure 40 further comprises wheel support wires 55 disposed adjacent to front and rear portions of base 12. Support wires 55 may be formed by a plurality of transverse wires nearby positioned in correspondence to wheels 24 and/or 25 and configured to extend between lateral edges of frame 42. Wires 55 may be welded, removable attached, integrally formed, or otherwise in communication with structure 40 and frame 42. Wires 55 may comprise two or more individual transverse wires that extrude between opposing lateral edges of frame 42 and are spaced to receive associated wheels 24 or 25 when two or more carts 10 are in a vertically stacked state. In some embodiments, may form wheel receiving slots or recesses in the base 12 of cart 10 so that when wheels 24 or 25 are positioned above a corresponding cart 10 below, positioned cart 10 will be prevented from rolling off. The slot or recess of cart 10 may therefore be positioned so that when another cart 10 is seated above, the wheel receiving slot or recess is underneath wheels 24 or 25. Wires 55 may be closer together or wider apart than the remaining wires of structure 40 including transverse wires disposed along the center of base 12. In this regard, each of the two or more wires 55 may comprise multiple sub-wires conformed to adequately support predetermined loads created during vertical stacking of multiple carts 10 as well as to provide added overall cart strength to structure 40.

Vertically stacking of two or more carts 10 will now be described with reference to FIGS. 2, 6 and 7. FIG. 2 depicts a side view of multiple carts 10 vertically stacked. When two or more carts 10 are vertically stacked on top of each other, wheels 24 and 25 are seated between two or more associated wires 55. For a clearer understanding of one vertical stacking approach using two or more carts 10, FIGS. 6A and 6B, for example, depict an enlarged view of wheels 24 and 25 when arranged a stacked state. In FIG. 6A, the outer surface of wheel 25 is positioned between wires 55, wherein the space provided between wires 55 is defined by a chord of wheel 25. The space defined between wires 55 is sufficient to receive wheel 25 so that wheel 25 remains restrained from translational rotation or movement when in a stacked state. The space between wires 55 may be adjusted depending on chord of wheel 25 and in some embodiments the space may be manually adjusted by being slide from outside frame 42 after cart 10 has been assembled if, for example, chord of wheel 25 is larger or smaller than initially contemplated.

Alternatively, carts 10 may be secured to each other by providing a handle securing mechanism configured to secure handle 50 in pockets 30 of the corresponding stacked carts as shown, wherein the handle 50 is secured via a pin, fastener, or snapped thereon so that stored handled 50 and corresponding pocket 30 of corresponding stacking cart 10 is easily secured. Similarly, FIG. 6B depicts the outer surface of wheel 24 when positioned between wires 55, wherein the space provided between wires 55 is defined by a chord of wheel 24. The space defined between wires 55 corresponding to wheel 25 is configured to receive and restrict movement of wheel 24 when in a stacked state. Consequently, the space between wires 55 is adjustable depending on chord of 24.

As depicted in FIGS. 7A and 7B, wheel 26 comprises a larger chord relative to the chord of wheels 24 or 25. Wires 58 of structure 40 where wheel 26 coincides with a middle portion of base 12 of a corresponding stacked cart 10 provide larger or deeper spacing that allows wheel 26 to remain suspended in the air when stacked. This is particularly noticeable in FIG. 7B where wheel 26 is depicted situated slightly below structure 40. This is significant because it allows carts 10 to avoid rocking when vertically stacked since wheels 24 and 25 may be secured to the cart 10 directly underneath via attachment at wires 55. Yet, wheel 26 still provides rocking when cart 10 is in use so that users may still load heavy objects onto cart 10 and easily maneuver the same while also providing the capability to easily, vertically stack carts 10 since overall weight of cart 10 remains low in a stacked state.

Optionally, a latching or locking mechanism may be provided between handle 50 when positioned in receiver 45 or pocket 30 and successively stacked carts 10 so that an additional level is provided for securing stacked carts 10 to the positioned handles 50 of the cart 10 seated on the ground surface.

Further, the vertical stacking approach described herein requires no moving parts to effectively secure multiple carts 10 to each other. When a plurality of carts 10 are vertically stacked, only the cart 10 on the bottom of the plurality with associated wheels 25, 24 (fixed or swiveled as desired) is seated on the ground rendering maneuverability centralized onto one cart 10 of the plurality of vertically stacked carts 10. Further, where wheels 24 or 25 are of a low-friction material, the resultant reduced friction of stacking between wheels 24 and 25 and wires 55 allows for smoother engagement between corresponding carts 10 thereby reducing risk of damage to the structure 40 of each cart 10.

Additionally, since multiple handles 50 may be provided and removably attached to carts 10 at receivers 45 and/or pockets 30 on multiple sides, handles 50 serve to secure a plurality of vertically stacked carts 10 as shown in FIG. 2. Because bottom portion of elongate support members of handles 50 may be secured to cart 10 at receivers 45 or pockets 30 along perimetral edges of frame 42, upper carts 10 when stacked will avoid rolling or moving due to vertically protruding handles 50 providing translation restraint along edges of frame 42 so as to cause carts 10 to remain stacked. In FIG. 2 specifically, each of handles 50 is seen installed in pocket 30 of base 12 in an arrangement that prevents cart movement.

When wheels 24 and/or 25 comprise rotatable swivel features, each of handles 50 provides a user with an increased ability to control and maneuver carts 10 since handles 50 may be placed anywhere along lateral and longitudinal edges of frame 42. This is particularly advantageous since being able to vertically stack the one or more carts 10 will not directly depend on whether a user can access a particular side of cart 10 since cart 10 may be maneuvered from multiple locations such as the front, rear, and middle portions of base or some combination thereof. Further, locations of receivers 45 and pockets 30 may be adjustable by a user. For example, pocket 30 and/or receiver 45 may be detachable such as being snapped onto base 12 if a user requires handle 50 be placed at a predetermined location.

In some embodiments, wheels 24 and 25 may be rotated inwardly in a stacked state when received by the space of wires 55. In this embodiment, when wheels 24 and 25 are received by wires 55 of structure 40, stacked carts 10 with rotated, inward wheels 24 and 25 would be restricted from moving forwards, backwards, or the like due to the orientation of inwardly rotated wheel 24 and/or 25.

Figure 8:
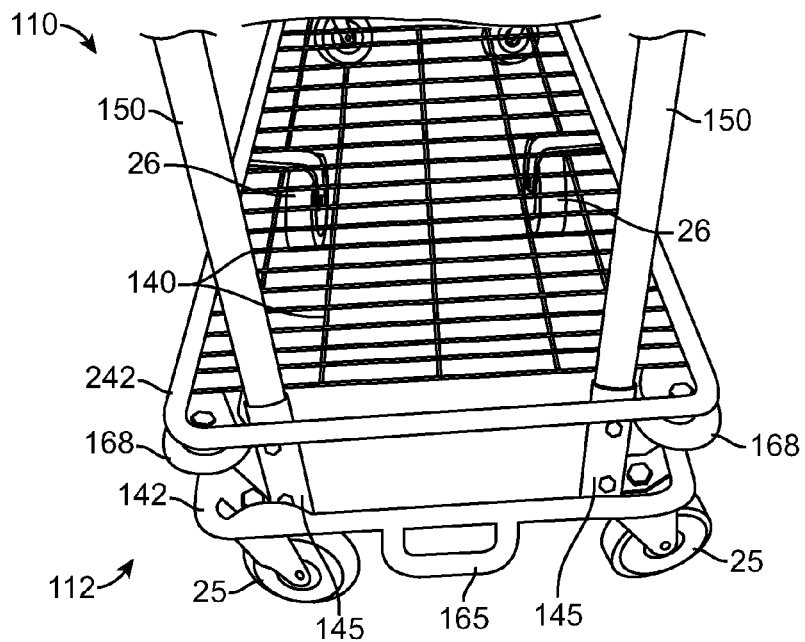
FIG. 8 is an elevated perspective view of an another embodiment of a stackable cart with a raised frame and edge bumper.

FIG. 8 depicts an elevated perspective view of another embodiment of a stackable cart 110, wherein cart 110 comprises raised frame 242 and edge bumper 165. It can be seen that cart 110 comprises base 112, base 112 comprising a generally rectangular frame 142 that is substantially planar with front, rear, and middle portions, wherein the front and rear portions may be interchangeable. In some embodiments, base 112 may be in an alternative shape and may not be substantially planar or rectangular. Further, base 112 may be open or closed at or along any of the perimetral edges of frame 142 (there are three edges in FIG. 8 with one of the edges not being depicted). Further, frame 142 may be formed from tubular wire members and comprise Raised frame 242 may positioned above frame 142, bed 242 comprising a similar rectangular shape and structure as frame 142

Internal support structure 140 may be provided and disposed in the same plane and arranged with perimetral edges of frame 242. In some embodiments, structure 140 may be comprised of an interconnected grid of wire which can be solid, tubular, or the like of relatively smaller diameter or thickness than the diameter or thickness of perimetral edges of frame 242. Providing cart 110 with raised frame 242 and support frame 142 is particularly advantageous to operators since it provides for easier stacking and unstacking of carts which conserves vital resources such as time and labor.

Additionally, parallel and horizontally spaced tubing of structure 140 with frames 242 and 142 provides for additional overall cart strength and integrity. Similar to structure 40, structure 140 may comprise a plurality of longitudinal wires positioned between front and rear portions of base 112 and a plurality of transverse wires positioned between lateral edges of frame 242 of base 112. Structure 140 may be welded to edges of frame 242 or integrally formed therewith. Though not depicted, structure 140 may optionally comprise double cross wires 144 to provide structure 140 with increased strength such as greater bending stiffness and improved load capacity. Double cross wires 144 may be positioned along one or more directions such as oriented along transverse wires, longitudinal wires, or the like. Wires 144 may be adjacent to or in communication with any of the internal support wires of structure 140. Structure 140 and all components or features comprised therein may be multiple layered or of wire grill constructions and may be constructed from metal, plastic, or the like.

Similar to previously described receivers 45, cart 110 may comprise one or more bored out sleeve receivers 145 that are positioned adjacent to perimetral edges of frame 142 which in some embodiments is along front and/or rear portions of base 112. Receivers 145 may protrude vertically from the lower section of base 112 (frame 142) towards frame 242. Each receiver 45 may removably attach to frames 142 and 242 or may be integrally formed with each by, for example, welding or the like.

In other embodiments, receivers 145 may be removably attached by being snapped onto, bolted, mounted, welded, fastened, removable attached, integrally formed with frames 142 and 242 and associated structure 140. Receivers 145 may be configured to receive handles 150 as described more particularly below. While FIGS. 8-11 depict cart 110 with two receivers 145 on two opposing edges of base 112, cart 110 is not so limited and may further comprise any number of receivers 145 associated with any number of locations on cart 110 in accordance with design needs or preference.

Receiver 145 may be configured to slidably and removably receive corresponding handle 150. Similar to handle 50 and receiver 45, handle 150 and corresponding receiver 145 may removably attach to each other by any fastening manner known in the art including bolts, cables, clamps, couplings, dowels, hooks, joints, keys, latches, locks, lugs, or the like. Once handle 150 is secured to cart 110, a user may securely stack two or more carts 110 so that stacked carts 110 are both prevented from sliding or moving from a stacked state as well as capable of being stored in relatively small space and be easily moved between locations using secured handles 150 to stack carts 110. Base 112 may optionally comprise one or more wire pockets 130 (not depicted though similar to previously described pockets 30 and corresponding features).

When not arranged in pockets 130 or receivers 145, handles 150 may be stored underneath frame 142 or between frames 142 and 242 which serves to conserve valuable storage space when carts are stacked. In some embodiments, handles 150 may be stored using storage and holding wires (not depicted though similar to previously described wires 56 and 60).

Figure 10:
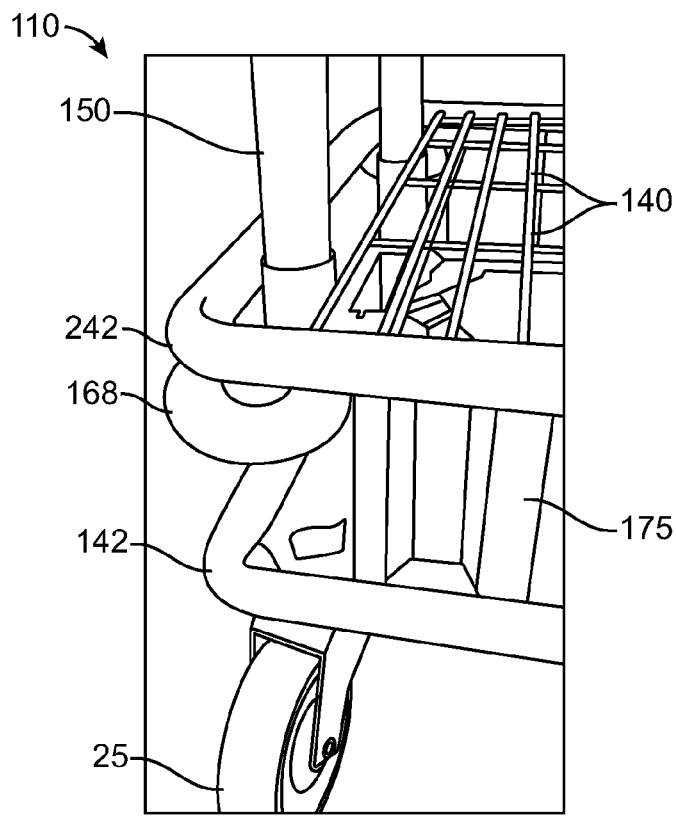
FIG. 10 is a close-up side perspective view of the embodiment of FIG. 8 depicting features of the raised frame of the stackable cart.
Figure 11:
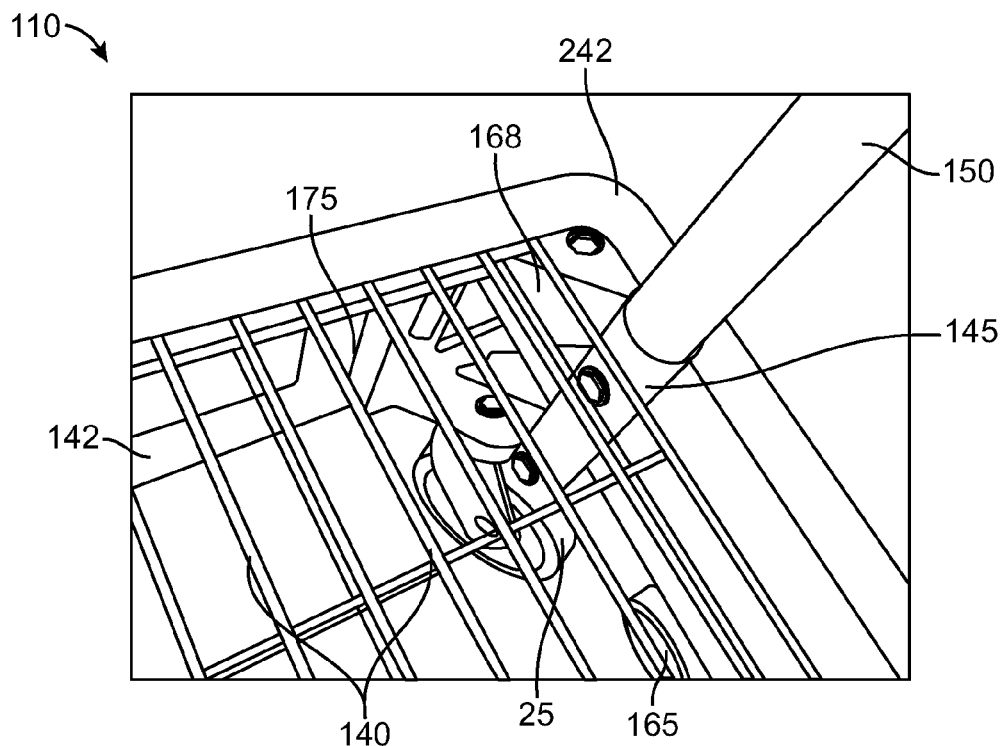
FIG. 11 is a close-up elevated perspective view of the embodiment of FIG. 8 depicting features of the raised frame of the stackable cart.

Cart 110 may further comprise one or more front caster wheels 24 and one or more rear caster wheels 25 mechanically attached to respective portions of base 112. Each of caster wheels 24 and 25 may be disposed adjacent to a respective corner or adjoining lateral and longitudinal edges of frame 142 or alternatively, wheels 24 and 25 may be disposed anywhere along or adjacent to a respective front or rear portion of base 112. As can be seen in FIGS. 10 and 11, receivers 145 may be in direct communication with corresponding wheel 24 or 25 which facilitates secure transfer of loading between handles 150 and frames 142 and 242 during use and stacking.

Figure 9:
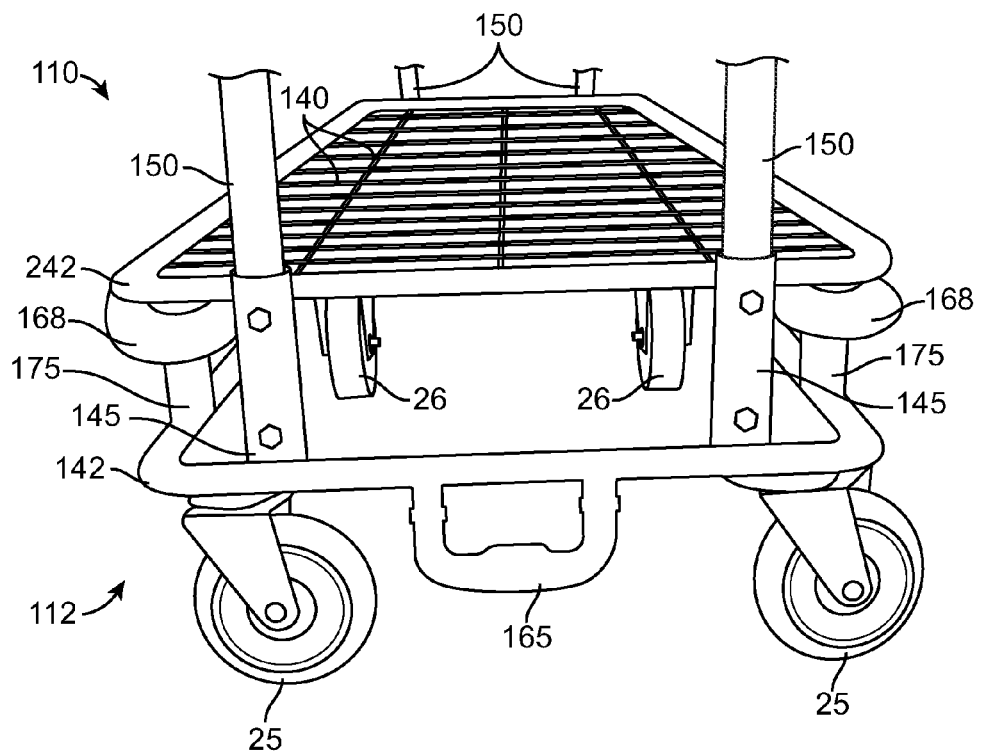
FIG. 9 is a forward perspective view of the embodiment FIG. 8.

As can be seen in FIGS. 8 and 9, one or more middle caster wheels 26 may be disposed between wheels 24 and 25. Wheel 26 may be non-swivel and generally protrude lower than wheels 24 and 25. The ratio of the chord and depth associated with wheels 24, 25, and 26 can be adjusted or changed depending on design needs or preference. Wheel 26 may attach to the underside of base 112 so that it protrudes downward from the base below a plane defined by the lowest point of wheels 24 and 25. In this embodiment, because wheel 26 is positioned by the lowest point of wheels 24 and 25, cart 110 is configured to permit rocking from end to end.

Cart 110 may further comprise edge bumper 165 in operative communication with frame 140 of base 112. Bumper 165 may be positioned between wheels 25 or wheels 24 depending on frame 140, wherein bumper 165 may be in a U- or C-shaped tube or member that protrudes from frame 140 towards the ground surface on which cart 110 is seated. In this respect, bumper 165 is operable to prevent corresponding wheels 24/25 from contacting objects such as curbs. Each cart may comprise only one bumper 165, only two bumpers 165 (one positioned on each side in concert with wheels 24/25, or may comprise any number of bumpers 165 as desired or needed. Bumper 165 may likewise be removably attached to or integrally formed with frame 140. FIGS. 8 and 9 each show bumper 165 extending between frame 140 and corresponding ground surface of cart 110 Bumper 165 may further extend horizontally passed corresponding wheels 25 and/or 25 so that forward protection is also provided to cart 110 and associated components to prevent contact with external carts, curbs or other objects.

Similar to cart 10, vertically stacking cart 110 requires no moving parts to effectively secure multiple carts 110 to each other. When a plurality of carts 110 are vertically stacked, only the cart 110 on the bottom of the plurality with associated wheels 25, 24 (fixed or swiveled as desired) is seated on the ground rendering maneuverability centralized onto one cart 110 of the plurality of vertically stacked carts 110.

As previously stated, FIG. 9 depicts a forward perspective view of cart 110, wherein horizontal edge bumpers 168 and corresponding frame supports 175. Each support 175 is operable to provide a secure support bridge between frames 142 and 242. Preferably, each cart may comprise a support 175 adjacent to, nearby or otherwise in communication with each corner of frames 142 and 242 which in the embodiments of FIGS. 8 and 9 would be four individual support 175. However, any number of supports may be provided depending on needs or preferences. Likewise, support 175 may be constructed from one or more elongate members sufficient to adequately support and couple each of frames 142 and 242 to each other. Each support 175 may be removably attached or integrally formed with frames 142 and/or 242.

Turning to FIG. 10 is a close-up side perspective view of a corner of cart 110 more clearly depicting the relationship of support 175 and bumper 168 with corresponding features of cart 110. Similarly, FIG. 11 is an elevated perspective view of a corner of cart 110. Observing FIGS. 10 and 11, it can be seen that bumper 168 may comprise a wheel with a rotatable shaft, bearing, ball, roller, bushing, axle, or the like (hereinafter "rotatable member"), wherein the rotatable member may be integrally formed with or removably attached with a corner of frame 242. In this respect, wheel of bumper 168 may be positioned so that wheel of bumper 168 may partially extend away from frame 242 and be operably to contact any foreign object. Wheel of bumper 168 may therefore be substantially parallel with frame 242, wherein bumper 168 may protect cart 110 from foreign objects such as other carts, curbs, or the like by sliding cart 110 passed said foreign object by rotatably guiding bumper 168 upon contact with the same. Bumper 168 may be positioned above or below frame 242. Optionally, more than one bumper 168 may be positioned on each corner (e.g. a bumper 168 positioned on each edge of the corner and/or above and below frame 242).

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cart, comprising:
   a base comprising a front portion, a middle portion, and a rear portion, the base comprising a frame comprising perimetral edges defined by the front, middle, and rear portions of the base;
   a plurality of front wheels supporting the front portion of the base above a lower surface;
   a plurality of rear wheels supporting the rear portion of the base above the lower surface; and
   an internal support structure positioned in the frame, the internal support structure comprising:
      a plurality of front transverse support members adjacent to the front portion extending between lateral edges of the perimetral edges, wherein two or more of the front transverse support members comprise a stacking space corresponding to a chord of the front wheel;
      a plurality of rear transverse support members adjacent to the rear portion extending between lateral edges of the perimetral edges, wherein two or more of the rear transverse support members comprise a stacking space corresponding to a chord of the rear wheel; and
      a plurality of middle wheels supporting the middle portion of the base, wherein a chord of the middle wheel is greater than the chord of the front and rear wheels, and
      wherein the internal support structure comprises middle transverse support members extending between the lateral edges along the middle portion of the base, wherein the middle transverse support members comprise a space greater or deeper than a diameter of the middle wheel so that the middle wheel is suspended when stacked, and
      such that the middle wheel hangs between and does not touch the middle transverse support members when the cart is stacked directly on top of an equivalent cart.

2. The cart according to claim 1, wherein the cart is stacked on top of an equivalent cart by positioning the plurality of front and rear wheels in the corresponding spaces of the plurality of front and rear transverse support members of the equivalent cart.

3. The cart according to claim 2, wherein inwardly rotating the front and rear wheels causes the cart to be secured in place when the cart is received by corresponding front and rear transverse support members of the equivalent cart.

4. The cart according to claim 1, wherein the front or rear transverse support members comprise one or more set of double cross wires.

5. The cart according to claim 1, further comprising one or more pockets coupled along the lateral edges, wherein one or more additional handles with elongate supports are removably attached to the one or more pockets so that elongate supports upwardly extend from the one or more pockets when attached thereto.

6. The cart according to claim 1, wherein the wheels are removably attachable to the base.

7. The cart according to claim 1, the internal support structure further comprising:
- a plurality of longitudinal support members extending between the front and rear portions of the base; and
- a plurality of transverse support members including the front and rear transverse support members, wherein the transverse support members substantially encircle the longitudinal support members along the lateral edges of the frame.

8. A cart, comprising:
- a base comprising a front portion, a middle portion, and a rear portion, the base comprising a frame comprising perimetral edges defined by the front, middle, and rear portions of the base;
- a plurality of front wheels supporting the front portion of the base above a lower surface;
- a plurality of rear wheels supporting the rear portion of the base above the lower surface; and
- an internal support structure positioned in the frame, the internal support structure comprising:
  - a plurality of front transverse support members adjacent to the front portion extending between lateral edges of the perimetral edges, wherein two or more of the front transverse support members comprise a stacking space corresponding to a chord of the front wheel;
  - a plurality of rear transverse support members adjacent to the rear portion extending between lateral edges of the perimetral edges, wherein two or more of the rear transverse support members comprise a stacking space corresponding to a chord of the rear wheel;
  - a first handle removably attached to a first plurality of sleeves coupled to the front portion of the base, wherein elongate supports of the first handle upwardly extend from the first plurality of sleeves when attached thereto; and
  - a second handle removably attached to a second plurality of sleeves coupled to the rear portion of the base, wherein elongate supports of the second handle upwardly extend from the second plurality of sleeves when attached thereto; and
- a front bumper operatively connected to the front transverse support members and the first plurality of sleeves; and
- a rear bumper operatively connected to the rear transverse support members and the second plurality of sleeves.

9. The cart according to claim 8, wherein the elongate supports of the first and second handles are handle receiving guides into which the ends of the handles are inserted.

10. The cart according to claim 9, wherein a shape of a cross-section of the handle guide is defined by the associated elongate support of the associated handle, the cross-section being generally rectangular, circular, u-shaped, elliptical, square, or polygonal.

* * * * *